Dec. 18, 1928.
W. N. BOOTH
BRAKE DRUM
Filed Aug. 11, 1925
1,695,526
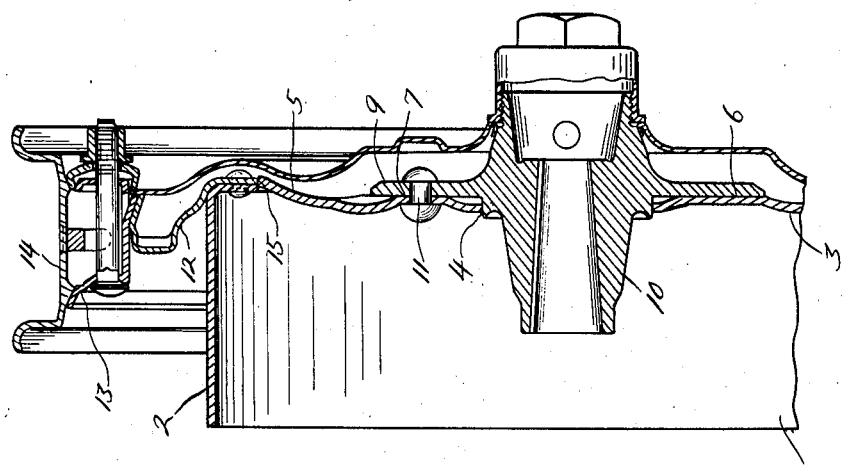
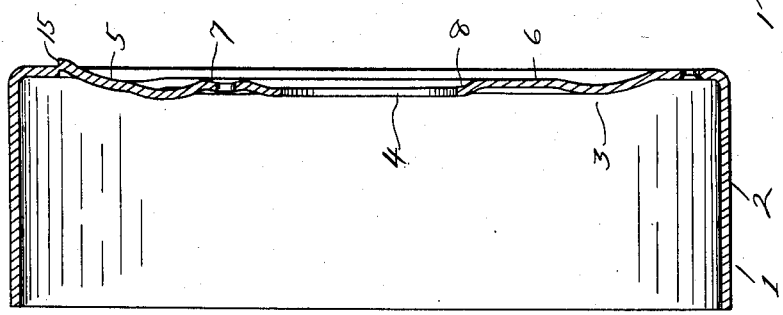
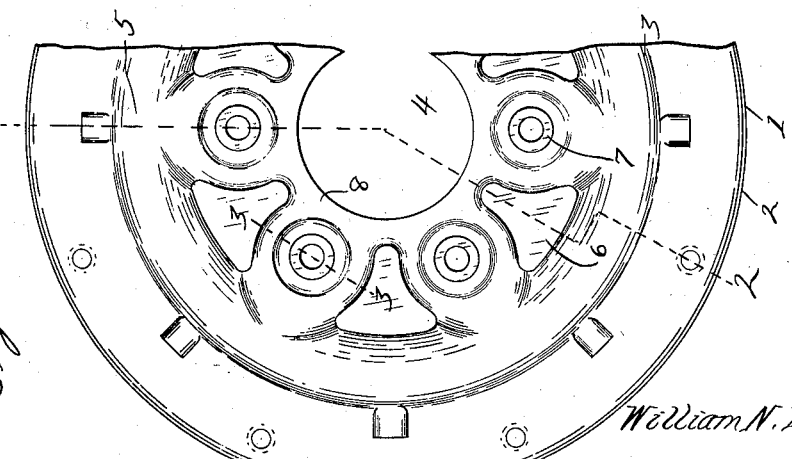
Inventor
William N. Booth
By Whittemore, Hulbert, Whittemore & Belknap
Attorneys Patented Dec. 18, 1928.

1,695,526

UNITED STATES PATENT OFFICE.

WILLIAM N. BOOTH, OF DETROIT, MICHIGAN, ASSIGNOR TO KELSEY-HAYES WHEEL CORPORATION, OF DETROIT, MICHIGAN, A CORPORATION OF NEW YORK.

BRAKE DRUM.

Application filed August 11, 1925. Serial No. 49,523.

The invention relates to brake drums and refers more particularly to brake drums of vehicle wheels of that type in which the brake drum forms a part of the wheel body. One of the objects of the invention is to provide a brake drum having its web reinforced by means of annular and radial ribs, the latter merging into the former. Another object is to provide bearing portions upon the web of the brake drum and intermediate the radial ribs for contacting with the fixed flange of the wheel hub. Further objects are the provision of securing portions in the radial ribs provided with openings for the passage of the means for securing the brake drums to the hub fixed flange and the provision of these securing portions having bearing faces which are laterally offset inwardly relative to the bearing faces of the bearing portions intermediate the ribs whereby the brake drum is firmly secured to the wheel hub and cracking of the web at the securing portions is avoided.

With these as well as other objects in view the invention resides in the novel features of construction and combinations and arrangements of parts as more fully hereinafter set forth.

In the drawings:—

Figure 1 is an outer side elevation of a brake drum embodying my invention;

Figures 2 and 3 are respectively cross sections on the lines 2—2 and 3—3 of Figure 1;

Figure 4 is a transverse section through a vehicle wheel embodying the brake drum.

The brake drum 1 is preferably formed of steel of uniform thickness by means of a pressing operation and comprises the brake flange 2 and the web 3, the latter having the axial opening 4. The web is provided with the laterally inwardly offset annular rib 5 near its outer edge, the laterally outwardly offset bearing portions 6 near its inner edge and terminating radially outward a slight distance therefrom and the radial ribs 7 intermediate the bearing portions and offset inwardly relative thereto and merging at their outer ends into the annular rib 5. With this arrangement the inner edge portion 8 of the web lies in the same plane and the web itself is strongly reinforced by both the annular and radial ribs.

For securing the brake drum 1 to the fixed flange 9 of the vehicle wheel hub 10 I have provided the securing portions 11 in the radial ribs 7, these securing portions being preferably laterally offset outwardly in the ribs and having their bearing faces normally offset inwardly relative to the bearing faces of the bearing portions 6 before the brake drum is secured to the fixed flange of the hub. Furthermore these securing portions are preferably inwardly convexed, the arrangement being such that when the means for securing the brake drum to the wheel hub such as the rivets 11 has been applied the securing portions and radial ribs are placed under compressive stress and the bearing faces of the securing portions are firmly secured against the fixed flange as well as the bearing faces of the bearing portions 6, thereby making a very tight, firm joint between the brake drum and wheel hub. Another very important advantage secured by this arrangement is that of avoiding cracking of the web of the brake drum at its points of connection with the fixed flange of the hub, owing to the fact that the metal may be sprung.

As shown particularly in Figure 4 the brake drum forms a part of the vehicle wheel body, it having secured to its web 3 near its outer edge the spacer 12 upon which is mounted in the present instance the channel shaped felly 13 which is arranged to have mounted thereon the demountable rim 14 for carrying the tire. For locating the spacer upon the web the latter is provided with the outwardly struck projections or lugs 15 radially outwardly beyond the annular rib 5, these projections or lugs presenting shoulders which are engageable with the inner edge of the spacer.

From the above description it will be readily seen that I have provided a brake drum having a strongly reinforced web which furthermore is so arranged that it is firmly secured to the wheel hub fixed flange in such a way that cracking of the web at its points of connection with the fixed flange is avoided.

What I claim as my invention is:

1. A brake drum formed from sheet steel having a circular brake flange and a web provided with pressed annular and radial ribs for reinforcing the web.

2. A brake drum formed from sheet steel of substantially uniform thickness having a circular brake flange and a web provided with a pressed annular rib and pressed radial ribs merging into said annular rib.

3. A brake drum formed from sheet steel having a circular flange and a web, said web being provided with pressed ribs having openings therein for the passage of the brake drum securing means.

4. A brake drum formed from sheet steel having a circular flange and a web, said web being provided with angularly spaced bearing portions and pressed ribs between said bearing portions and said ribs having openings therein for the passage of the brake drum securing means.

5. A brake drum formed from sheet steel having a web provided with angularly spaced bearing portions and pressed ribs intermediate said bearing portions, said ribs being provided with securing portions having their bearing faces laterally offset relative to the bearing faces of said bearing portions and formed with openings therein for the passage of the brake drum securing means.

6. A brake drum formed from sheet steel of substantially uniform thickness having a circular flange and a web, said web being provided with a pressed annular rib near its outer edge, bearing portions near its inner edge and ribs intermediate said bearing portions and merging into said annular rib, said last mentioned ribs being provided with securing portions having bearing faces laterally offset relative to the bearing faces of said bearing portions and provided with openings for the passage of the brake drum securing means.

7. In a vehicle wheel, a web element having near its outer edge a pressed annular rib and pressed lateral projections and near its inner edge angularly spaced bearing portions with their bearing faces laterally offset relative to said annular rib, and ribs intermediate said bearing portions and merging into said annular rib and having openings therein for the passage of the brake drum securing means.

8. A brake drum formed from sheet steel having a circular flange and a web provided with angularly spaced bearing portions and pressed annular and radial ribs for reinforcing the web.

9. A brake drum formed from sheet steel having a web provided with spaced bearing portions, and securing portions having their bearing faces laterally offset relative to the bearing faces of said bearing portions and formed with openings therein for the passage of the brake drum securing means.

In testimony whereof I affix my signature.

WILLIAM N. BOOTH.